United States Patent [19]
Petersen

[11] Patent Number: 4,557,356
[45] Date of Patent: Dec. 10, 1985

[54] BRAKE DISK AND KEYSLOT REINFORCEMENTS THEREFOR

[75] Inventor: Don W. Petersen, North Canton, Ohio

[73] Assignee: Goodyear Aerospace Corporation, Akron, Ohio

[21] Appl. No.: 605,087

[22] Filed: Apr. 30, 1984

[51] Int. Cl.[4] ............................................. F16D 65/12
[52] U.S. Cl. ........................... 188/218 XL; 192/107 R
[58] Field of Search ........... 188/73.2, 218 XL, 251 A; 192/107 R

[56] References Cited

U.S. PATENT DOCUMENTS 3,934,686  1/1976  Stimson et al. .......... 188/218 XL X
4,007,814  2/1977  Berger ......................... 188/218 XL
4,465,165  8/1984  Bok ............................. 188/218 XL Primary Examiner—Duane A. Reger
Attorney, Agent, or Firm—L. A. Germain; P. E. Milliken

[57] ABSTRACT

A friction brake disk is formed having a plurality of T-shaped slots extending through a peripheral edge thereof from one braking face surface to the other and each slot carries a keyslot reinforcement comprised of a metallic insert member having the same T-shaped configuration such as to be easily inserted in the slot in the axial direction of the disk but restrained from being removed in the radial direction. Each insert member is locked within the slot in the axial direction by at least one retaining clip that is fastened to the insert member and extends beyond the slot into the face surface of the disk.

10 Claims, 13 Drawing Figures

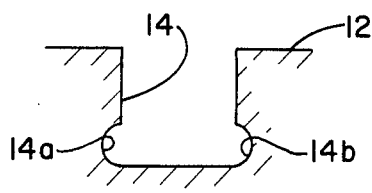
FIG.-3a
FIG.-3
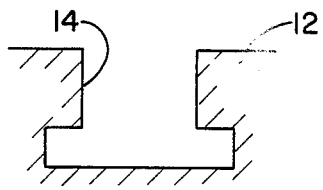
FIG.-3b
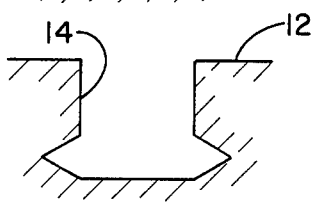
FIG.-3c
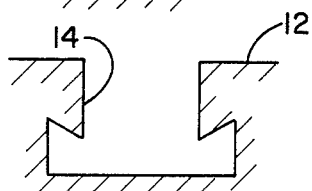
FIG.-3d
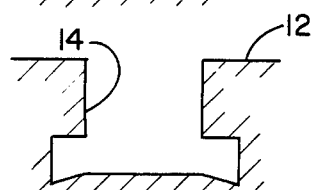
FIG.-3e
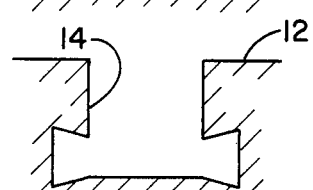
FIG.-3f
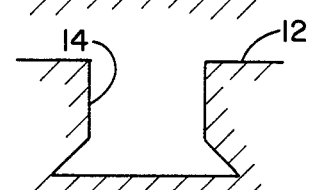
FIG.-3g
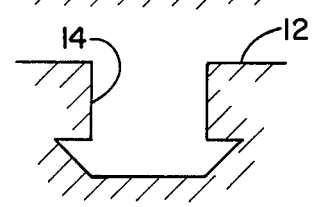
FIG.-3h
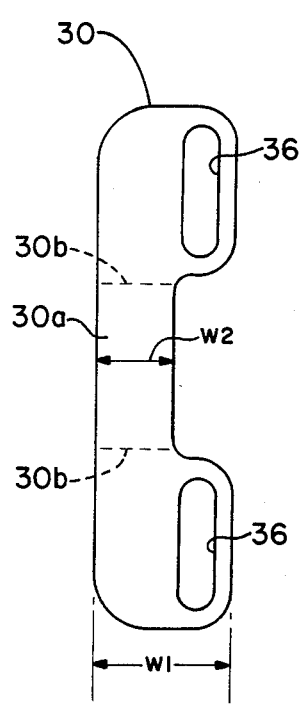
FIG.-4

BRAKE DISK AND KEYSLOT REINFORCEMENTS THEREFOR

BACKGROUND OF THE INVENTION

This invention relates to brake disks and pertains more particularly to a disk keyslot reinforcement that is affixed to the disk in a manner which eliminates drilled-through holes in the material comprising the disk structure.

While the keyslot reinforcement concept of this invention may be applied to a disk of any material structure, the increased use of carbon disks in aircraft and other type disk brake assemblies has necessitated design configurations for keyslot reinforcements to compensate for structural limitations in such carbon disks. Exemplary of the prior art keyslot reinforcements are those described and illustrated in the following U.S. patents: U.S. Pat. No. 3,904,000 to R. E. Berger; U.S. Pat. No. 3,907,076 to R. L. Crossman, et al; U.S. Pat. No. 3,927,740 to R. L. Zarembka; and U.S. Pat. No. 4,007,814 to R. E. Berger.

The use of keyslot reinforcements of the type described in the above-mentioned patents has resulted in improved carbon disk life, however, conventional methods of affixing such reinforcements to the peripheral edge of the disk have not been totally satisfactory. This is because of (a) the increased weight of the reinforcements due to longer legs to accommodate drilled-through holes in the disk, (b) the high reaction forces present in the holes due to a greater moment arm, (c) the special tolerances and/or hole geometries necessary to alleviate thermal expansion forces, and (d) fatigue failure and/or excessive loosening of the reinforcements which results due to the lack of restrainment at the keyslot itself. Furthermore, the reinforcements of the prior art are of necessity made of special heat resistant alloys. These alloys are required to maintain the structural strength of the reinforcements for reasonable service life at elevated temperatures under the above-mentioned loading conditions, however, such alloys are not easily hardened. This, of course, results in excessive wear at the wheel key-to-keyslot reinforcement interface. In addition, the relatively thin section thickness of currently stamped steel reinforcements is not sufficiently flat and rigid to uniformly transmit braking torque forces into the carbon material surrounding the slot which carries the reinforcement. This results in localized area of compressive failure which reduces the required bearing area of the carbon material.

SUMMARY OF THE INVENTION

Various advantages of this invention will become more apparent from the following specification and the accompanying drawings wherein a friction brake disk means comprises opposite surfaces forming annular braking faces lying in the planes transverse to the axis of rotation of the disk, said disk having a plurality of substantially T-shaped slots spaced around a peripheral edge thereof and extending transversely therethrough from one braking face surface to the other, and keyslot reinforcement means mounted in each of said T-shaped slots and comprising a metallic insert member having a keyslot formed therethrough and a peripheral configuration approximating the T-shaped slot in the disk and slidably mounted within the slot, and retaining means affixed to the inert and overlapping a portion of the disk about the T-shaped slot to capture and retain the metallic insert within the slot.

BRIEF DESCRIPTION OF THE DRAWINGS

FIG. 3 inclusively, of FIGS. 3a–3h, illustrates schematically various geometrical configurations for locking a keyslot reinforcement into a slot in the peripheral edge of the disk;

FIG. 4 is a plan view of retaining means as may be applied to capture an insert member of a keyslot reinforcement means within a peripheral edge slot in a brake disk prior to being bent to a U-shaped clip configuration;

DETAILED DESCRIPTION OF THE INVENTION

Figure 1:
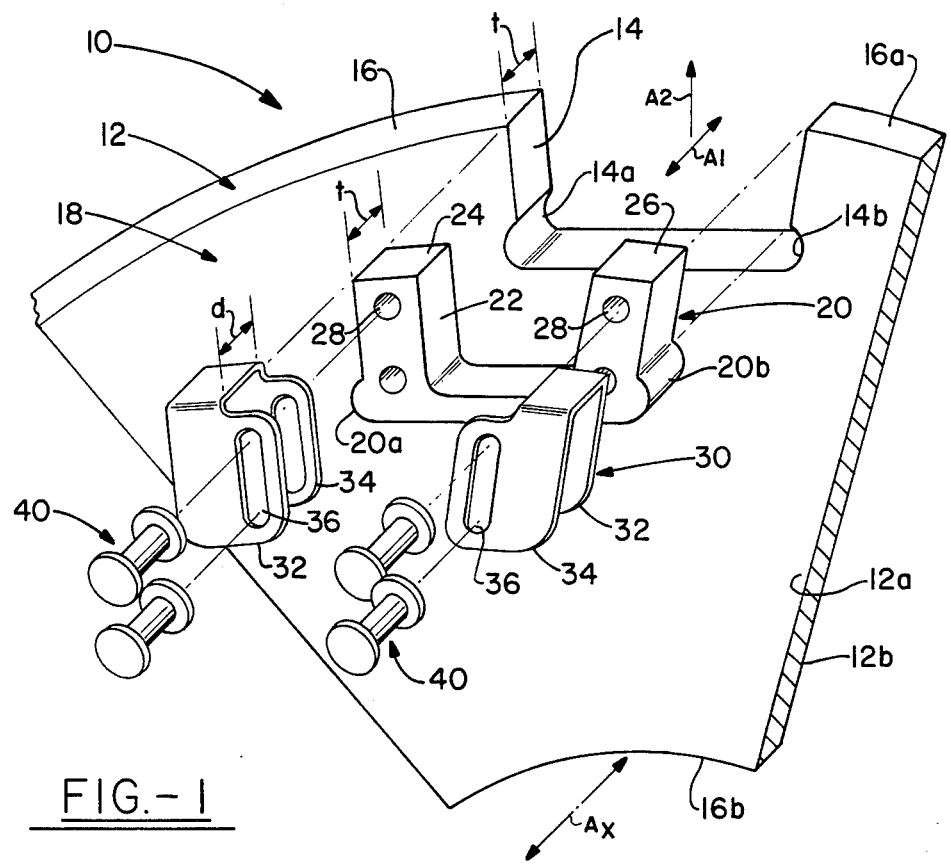
FIG. 1 is a perspective assembly showing a fragmented segment of a brake disk in the area of a peripheral edge transversely oriented slot and the elements forming a keyslot reinforcement according to this invention.
Figure 2:
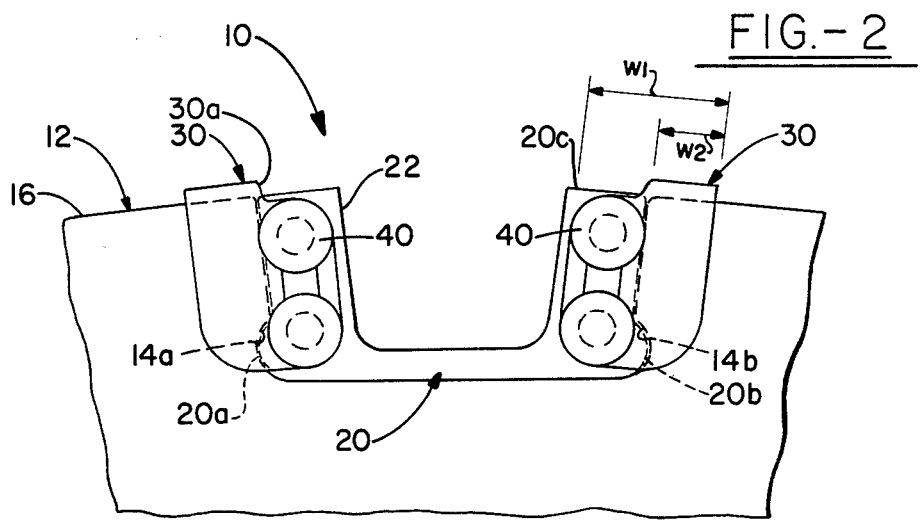
FIG. 2 is an elevational view of an arc segment of a brake disk having a keyslot reinforcement means as shown in FIG. 1 affixed within the slot in the peripheral edge of the disk.

Referring to FIGS. 1 and 2 of the drawings, the numeral 10 indicates generally a brake disk assembly including a continuous annular friction disk or ring 12 of carbon based material. The friction disk 12 is characterized by opposite surfaces 12a and 12b which form annular braking faces lying in planes transverse to the axis of rotation of the disk as indicated by directional arrow Ax. A plurality of slots 14 (only one being shown) extend transversely through a peripheral edge 16 of the disk 12 from one face surface 12a to the opposite face surface 12b and conventionally the slots 14 will carry a reinforcement which includes a configuration of a keyway or keyslot for engagement with drive keys of either a rotating wheel or a relatively stationary torque tube. When a keyslot reinforcement is positioned in the disk 12 for engagement with a drive key of a rotating wheel (not shown), the slot 14 is formed within an outer peripheral edge 16a of the disk as shown in the drawing. When positioned in the disk 12 for engagement with a key of a torque tube (not shown), the slot 14 is formed within an inner peripheral edge 16b of a bore passing transversely through the axial center of the disk 12. Accordingly, the location and/or position of the slots 14 and their keyslot reinforcements is not a limiting factor of this invention.

The slots 14 are of a substantially T-shaped configuration and the top of the T-shape is positioned radially inwardly of the peripheral edge 16 of the disk 12. This is true whether a slot 14 is formed within an outer peripheral edge 16a or an inner peripheral edge 16b as mentioned above. The ends of the T-shaped slot indicated at 14a and 14b may, of course, have any geometric configuration and a few of these are illustrated schematically in FIGS. 3a–3h of FIG. 3. In any event, the purpose of the end configuration 14a, 14b is a lock an insert member of a keyslot reinforcement assembly within the slot 14 and prevent it from moving radially out of the slot as will be more fully appreciated from the description which follows.

A keyslot reinforcement assembly is generally indicated by reference numeral 18 and comprises an insert member 20, retaining means 30, and fasteners 40. As readily apparent from the drawing, the insert member 20 has a substantially T-shaped outer peripheral configuration which matches the shape of the slot 14 in the disk 12. The insert member 20 has a thickness "t" that is substantially, but not necessarily, the thickness of the disk 12 and the top of the insert has matching ends 20a and 20b which are of the same geometrical configuration as the ends 14a and 14b respectively within the slot 14. The insert member 20 is further characterized by a keyway or keyslot 22 formed transversely therethrough which divides the base of the "T-shape" into two legs 24 and 26 having apertures or drilled-through holes 28 therein. The insert member 20 is a solid steel piece and the keyslot 22 may be especially hardened for long life inasmuch as it cooperates with a drive key of either a rotating wheel or a torque tube in a conventional manner. It must be appreciated from the foregoing description that the insert 20 is shaped for slidable insertion within the disk slot 14 in the direction of arrow A1. Because the ends 20a and 20b are captured within the confines of the slot ends 14a and 14b respectively, the insert 20 may not be removed from the slot 14 in the radial direction of arrow A2.

Now therefore, the insert member 20 is further captured within the slot 14 in the transverse direction of arrow A1 by reason of retaining means 30 as shown in FIG. 2 of the drawings. The retaining means 30 may be stamped from flat steel stock and thereafter bent to a U-channel or clip configuration having a distance "d" between spaced apart legs 32 and 34 that is substantially the thickness "t" of the disk 12. Each leg 32, 34 of a retainer 30 has an aperture 36 therethrough and these are aligned with the holes 28 in the legs 24, 26 of the insert member 20 when the retainer is straddled about the edge of disk 12 at opposite ends of the insert member 20. To complete the assembly, fasteners 40 are inserted through the holes 28 and locked in position. The fasteners, of course, may be any suitable fastener, rivet, bolt, or the like.

As mentioned, the thickness "t" of the steel insert member 20 may be, but is not necessarily, the thickness of the disk 12. Preferably, the thickness "t" of the insert is slightly less than the thickness of the disk 12 such that when the retaining clips 30 are fastened to the disk/insert assembly, a compressive force is exerted on the disk structure around the slot 14. In this circumstance, a slight preloading of the disk in this manner transmits drive key torque forces to the carbon material of the disk structure over a wide load bearing area.

The retaining means 30 are in the form of U-shaped clips but these may be stamped from flat stock material as illustrated in FIG. 4 of the drawings. While the clips may take on various configurations which come to mind, it is important that the width W1 is sufficient to cover the insert member 20 in the area of the holes 28 and also a portion of the disk 12 on opposite face surfaces 12a and 12b so as to capture the insert 20 within the slot 14. Further, and so as to reduce the weight of each clip 30, the central portion 30a may be narrowed to a width W2 since it is not necessary to cover the steel insert member 20 at the outer peripheral edge 20c as shown in FIG. 2. This is true because the insert member 20 cannot be removed from the slot 14 in the radial direction due to the slot ends 14a,14b interfacing with the insert ends 20a,20b respectively. In addition, each clip 30 has slot-passages 36 for receiving the fasteners 40 therethrough and while these may be in the form of drilled-through holes, the slot-passages 36 aid in further reducing the overall weight of such clips and also allow for greater latitude in alignment with the holes 28 in the insert members 20 when bent to a U-shaped clip configuration along the lines 30c and affixing the fasteners 40 through the assembly of insert member 20 and disk 12.

Figure 6:
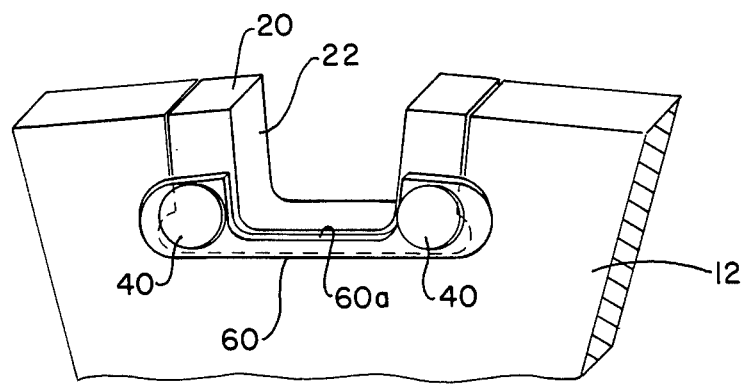
FIG. 6 is a perspective view of still another embodiment for retaining means.
Figure 5:
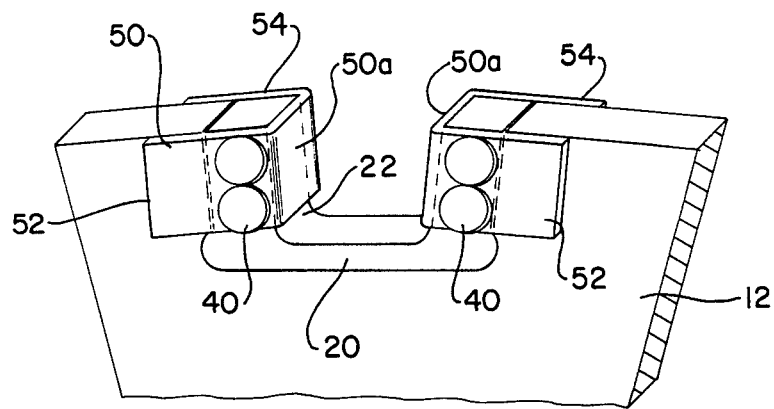
FIG. 5 is a perspective view of another embodiment for a U-shaped clip retaining means.

FIGS. 5 and 6 illustrate alternative embodiments for retaining means 30 which may be applied to capture an insert member 20 within a peripheral edge disk slot 14.

In FIG. 5, clips 50 are in a U-shaped configuration similar to the clips 30, however, they are rotated ninety degrees such that the interconnecting bridge portion 50a between the legs 52,54 is positioned within the area of the keyslot 22 of the insert member 20. In this circumstance, the bridge portion 50a functions as a bearing surface of the keyslot when a drive key is positioned therein. Accordingly, the bridge portion 50a may be especially hardened for longer life in this service capacity. An obvious advantage of this clip arrangement is the face that the clips 50 do not extend beyond the peripheral edge of the disk 12 such as to interfere with any portion of a drive key apparatus which engages the keyslot 22.

FIG. 6 illustrates a retaining means in the form of a flat bar-like piece 60 positioned on opposite sides of the disk 12. The bar piece 60 has a length sufficient to extend into the area of the disk 12 on either side of the insert member 20 and thus functions to capture the insert member within the slot 14. So as not to interfere with the operation of a drive key positioned within the keyslot 22, the bar piece 60 has a U-shaped portion 60a which is slightly larger than the U-shaped keyslot 22.

While certain representative embodiments and details have been shown or described in detail for the purpose of illustrating the invention, it will be apparent to those skilled in the art that various changes and modifications may be made therein without departing from the spirit or scope of the invention.

What is claimed is:

1. A friction disk having opposite surfaces forming annular braking faces lying in planes transverse to an axis of rotation of the disk and a plurality of evenly-spaced, substantially T-shaped slots formed within a peripheral edge of the disk and extending therethrough from one braking face surface to the other, a top portion of the T-shaped slot being oriented radially inwardly from the peripheral edge of the disk; and a keyslot reinforcement means mounted within each of said T-shaped slots comprising a metallic insert member having a substantially T-shaped peripheral configuration which matches the T-shaped slot in the disk such as to be received in mating relationship within the slot in the axial direction from one braking face surface of the disk to the other but restrained from being removed from the slot in the radial direction, said insert member having a substantially U-shaped keyslot formed therein and facing radially outwardly of the disk and, retaining means fastened to opposite sides of the insert member and extending to coact with the face surfaces of the disk such as to capture the insert member within the T-shaped slot.

2. The friction disk as set forth in claim 1 wherein the disk comprises a carbon based material.

3. The friction disk as set forth in claim 1 wherein the T-shaped slots are formed within an outer peripheral edge of the disk.

4. The friction disk as set forth in claim 1 wherein the T-shaped slots are formed within an inner peripheral edge of the disk formed by a bore passing through the axial center of the disk.

5. The friction disk as set forth in claim 1 wherein the retaining means comprises a clip in a substantially U-shaped configuration having a pair of spaced-apart legs interconnected by a bridge portion, each said leg fastened to the insert member and coacting with an opposite braking face surface of the disk such as to capture the insert member within the T-shaped slot.

6. The friction disk as set forth in claim 5 wherein the retaining means comprises a pair of U-shaped clips each said clip being positioned on an opposite side of the U-shaped keyslot within the insert member.

7. The friction disk as set forth in claim 6 wherein each said clip is rotated 90 degrees such that the bridge portion of each clip spans the keyslot of the insert member from one braking face surface of the disk to the other to provide a drive key bearing face surface within the keyslot.

8. The friction disk as set forth in claim 7 wherein the bridge portion of each said clip is hardened to provide a long-life bearing surface.

9. The friction disk as set forth in claim 1 wherein the retaining means comprises flat, substantially rectangularly-shaped metal pieces fastened on opposite braking face surfaces of the disk by rivets passing through the insert member.

10. The friction disk as set forth in claim 1 wherein the top portion of the T-shaped slot in the disk has opposite end portions defining a specific geometric configuration.

* * * * *